D. M. DICKINSON.
CHECK.
APPLICATION FILED SEPT. 23, 1920.
1,383,792.
Patented July 5, 1921.
2 SHEETS—SHEET 1.
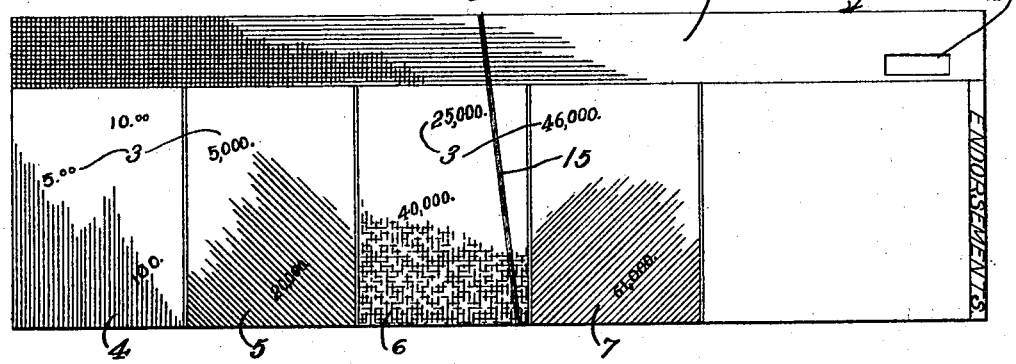
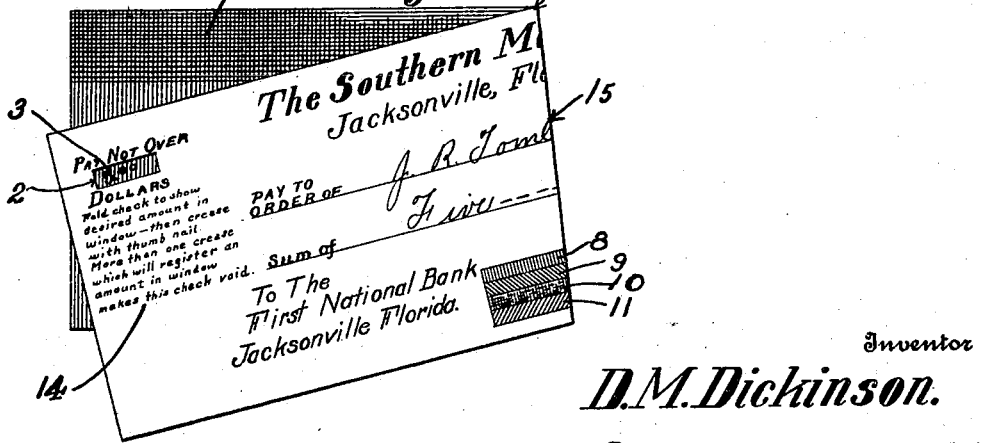
Inventor
D. M. Dickinson.
By C. A. Snow & Co.
Attorneys

D. M. DICKINSON.
CHECK.
APPLICATION FILED SEPT. 23, 1920.

1,383,792.

Patented July 5, 1921.
2 SHEETS—SHEET 2.

Inventor
D. M. Dickinson.
By C. A. Snow & Co.
Attorneys

UNITED STATES PATENT OFFICE.

DWIGHT M. DICKINSON, OF ATLANTA, GEORGIA.

CHECK.

1,383,792.   Specification of Letters Patent.   Patented July 5, 1921.

Application filed September 23, 1920. Serial No. 412,134.

*To all whom it may concern:*

Be it known that I, DWIGHT M. DICKINSON, a citizen of the United States, residing at Atlanta, in the county of Fulton and State of Georgia, have invented a new and useful Check, of which the following is a specification.

It is the object of this invention to provide a piece of commercial paper, the value of which cannot be raised feloniously.

Although satisfactory embodiments of the invention are disclosed in the drawings, a check printer or banker may make changes in the precise structure shown, without departing from the spirit of the invention.

In the drawings:—

Figure 1 shows the face of a check embodying the invention;

Fig. 2 shows the back of the check;
Fig. 3 shows the check folded;

Figure 4:
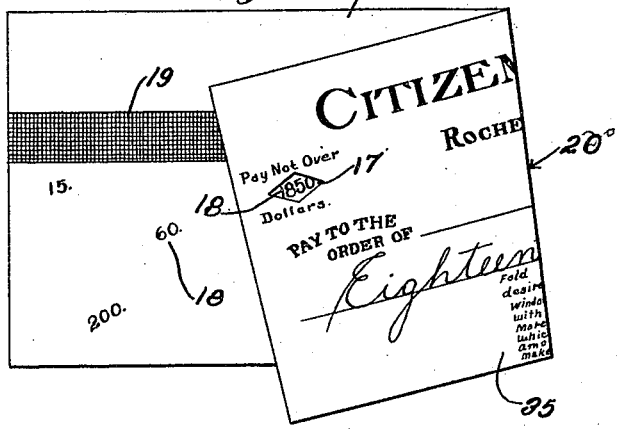
Figure 5:
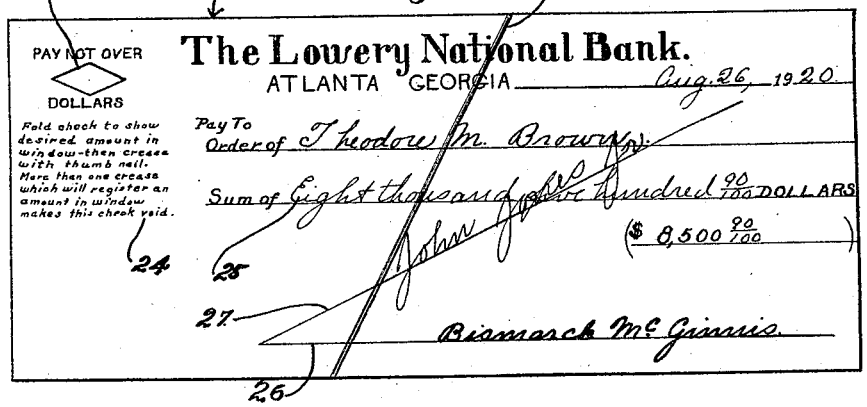

Fig. 4 discloses a modification, the check being folded;

Fig. 5 is a face view showing a further modification in the check.

Although the invention may be embodied in commercial paper of various kinds, a check has been selected as a means of illustration. The numeral 1 denotes a piece of commercial paper provided with an opening
2. On the back of the paper 1 there are marks 3 denoting value. The marks 3 are arranged in groups, and the groups are located in distinctively colored areas 4, 5, 6 and 7. There may be any number of areas, and any number of marks in each area. On the face of the paper there are signature spaces 8, 9, 10 and 11, colored, respectively, to correspond with the areas 4, 5, 6 and 7. Along the back of the paper 1 extends a distinctively colored area 12 which is disposed parallel to the length of the paper. On the face of the paper 1, or elsewhere, there is a monitory legend 14 to the effect that the paper will be void if it has more than one crease which will cause one of the marks 3 to register with the opening 2.

In practical operation, the piece 1 of paper is folded and creased along a line 15, so that the value of the paper, or, at least, the approximate value of the paper, noted by the appropriate mark 3, appears through the opening 2. When the paper is opened out, as shown in Fig. 1, the crease 15 will remain in the paper. Any sort of paper may be used, but it may be expedient to employ a special paper which will retain a crease. Since the crease 15 will bring but one of the marks 3 into registration with the opening 2, and since the legend 14 points out that more than one crease which will cause a mark to register with the opening, renders the paper void, a raising of the value of the paper will be exceedingly difficult if not actually impossible, in practice. As a further safeguard, the person drawing the paper signs his name on one of the signature spaces 8, 9, 10 or 11, and since these spaces are colored to correspond with the areas 4, 5, 6 and 7 in which the various marks 3 are located, an additional means is provided for frustrating the efforts of a check-raiser.

It occasionally happens that, in a check book which is folded, for carrying in the pocket, a crease will be formed in the paper, at right angles to the length of the paper. When such a crease is formed, the area 12 will register with the opening 2, but the check will not be void, owing to the provision in the legend 14 to the effect that a crease, in order to render the paper void, must cause one of the marks 3 to register with the opening 2.

Fig. 4 discloses a modified and simplified form of the invention. The piece 16 of paper has an opening 17 of the kind hereinbefore mentioned, through which the marks 18 on the back of the paper are visible, one at a time, when the paper is creased as shown at 20. The longitudinal area on the back of the paper is shown at 19, and the legend appears at 35. In this form of the invention, the marks 18 are not located in areas like those designated at 4, 5, 6 and 7, and the corresponding signature spaces 8, 9, 10 and 11 are not used. The color of the area 12 appears at a glance, through the opening 2, and when the color appears through the opening, no lengthy examination of the paper, to determine its validity, is necessary. The colored area 12, further, is a convenience to the drawer of the paper, since he can fold his paper, for carrying, without voiding the paper, provided that the fold is so made that the area 12 registers with the opening 2.

In Fig. 5, the numeral 21 marks the piece of paper, the opening appearing at 22 and the crease being shown at 23. The legend is designated by the numeral 24. The value of the check is written in, in the usual way, as at 25. On the face of the piece 21 of paper, there are diverging signature lines 26 and 27, the line 27 extending across the space in which the value of the check is written at 25. The person drawing the check may sign on either of the lines 26 or 27 and the check may be countersigned on the other line by a different person. If the check is not countersigned, then but one signature will appear. The signature on the line 27 extends across the words 25 which denote the value of the check, to the end that check-raising may be made the more difficult.

Having thus described the invention, what is claimed is:—

1. A piece of commercial paper provided with an opening and having a mark denoting value, the paper having a crease which is visible when the paper is unfolded, the mark registering with the opening when the paper is folded at the crease.

2. A piece of commercial paper provided with an opening and having a mark denoting value, the mark registering with the opening when the paper is folded and creased, the paper being further characterized by the provision of a distinctively designated area which is visible through the opening when the paper is folded on a line substantially at right angles to the length of the paper.

3. A piece of commercial paper provided with an opening and having a mark denoting value, the mark registering with the opening when the paper is folded and creased, the paper being further characterized by the fact that the mark is located in an area having a distinctive characteristic, the paper being provided with a signature space having the same characteristic.

In testimony that I claim the foregoing as my own, I have hereto affixed my signature in the presence of two witnesses.

DWIGHT M. DICKINSON.

Witnesses:
R. S. FITZGERALD,
CLARA D. FITZGERALD.